US011623542B2

(12) United States Patent
Shiraishi et al.

(10) Patent No.: US 11,623,542 B2
(45) Date of Patent: Apr. 11, 2023

(54) CONTROL METHOD FOR VEHICLE POWER SUPPLY APPARATUS AND VEHICLE POWER SUPPLY APPARATUS

(71) Applicant: Mazda Motor Corporation, Hiroshima (JP)

(72) Inventors: Wataru Shiraishi, Aki-gun (JP); Shinya Fujioka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 351 days.

(21) Appl. No.: 16/989,894

(22) Filed: Aug. 11, 2020

(65) Prior Publication Data

US 2021/0053461 A1 Feb. 25, 2021

(30) Foreign Application Priority Data

Aug. 20, 2019 (JP) ............................ JP2019-150465

(51) Int. Cl.
*H02J 7/34* (2006.01)
*B60L 15/20* (2006.01)
(Continued)

(52) U.S. Cl.
CPC ............... *B60L 58/18* (2019.02); *B60L 15/20* (2013.01); *E05B 77/12* (2013.01); *E05B 81/86* (2013.01);
(Continued)

(58) Field of Classification Search
CPC ...... B60L 58/18; B60L 15/20; B60L 2240/14; B60L 3/0007; B60L 3/0046; B60L 3/04;
(Continued)

(56) References Cited

U.S. PATENT DOCUMENTS

2003/0155779 A1* 8/2003 Belmond ........... G07C 9/00309 292/216
2017/0197565 A1* 7/2017 Yoneyama .............. B60R 16/03
(Continued)

FOREIGN PATENT DOCUMENTS

EP 3396089 A1 10/2018
JP 2003-262054 A 9/2003

OTHER PUBLICATIONS

Extended European search report dated Feb. 3, 2021, in corresponding European patent Application No. 20189740.2, 8 pages.

*Primary Examiner* — Jared Fureman
*Assistant Examiner* — Aqeel H Bukhari
(74) *Attorney, Agent, or Firm* — Xsensus LLP

(57) ABSTRACT

The vehicle power supply apparatus includes: a drive power supply that supplies electric power to a motor for generating drive power; an auxiliary power supply that supplies electric power to a motor controller and door lock controllers; and a backup power supply. A control method for the vehicle power supply apparatus includes: discharging the in-vehicle equipment by using the electric power that is supplied from the backup power supply when it is determined that a vehicle has collided with an obstacle; and operating the door lock controllers by using the electric power that is supplied from the backup power supply after a lapse of a specified time period since initiation timing of the discharging step so as to unlock doors.

20 Claims, 4 Drawing Sheets

(51) Int. Cl.
*E05B 81/86* (2014.01)
*E05B 77/12* (2014.01)
*B60L 58/18* (2019.01)
*H02J 7/00* (2006.01)

(52) U.S. Cl.
CPC ............ *H02J 7/0063* (2013.01); *H02J 7/345* (2013.01); *B60L 2240/14* (2013.01)

(58) Field of Classification Search
CPC ............ B60L 58/10; B60L 1/00; E05B 77/12; E05B 81/86; H02J 7/0063; H02J 7/345; Y02T 10/70; Y02T 10/72
See application file for complete search history.

(56) References Cited

U.S. PATENT DOCUMENTS

2017/0294791 A1 10/2017 Mito
2019/0003213 A1* 1/2019 Yokomori ............... E05B 81/66

* cited by examiner

CONTROL METHOD FOR VEHICLE POWER SUPPLY APPARATUS AND VEHICLE POWER SUPPLY APPARATUS

CROSS-REFERENCE TO RELATED APPLICATION

The present application claims priority to JP 2019-150465, filed Aug. 20, 2019, the entire contents of which are incorporated herein by reference.

TECHNICAL FIELD

The present disclosure relates to a control method for a vehicle power supply apparatus and a vehicle power supply apparatus.

BACKGROUND ART

In recent years, spread of electric vehicles, each of which includes a motor as a drive source, has been accelerated. A drive power supply such as a lithium-ion battery for supplying electric power to the motor is mounted on each of such vehicles. DC power that is output from the drive power supply is supplied to in-vehicle equipment such as an inverter, is converted into AC power, and is then supplied to the motor. In addition to the drive power supply, a controller for controlling the inverter and the like and an auxiliary power supply for supplying the electric power to the controller are mounted on the electric vehicle.

In order for the motor to generate high torque that is required for travel of the vehicle, the drive power supply outputs the high-voltage DC power. This electric power is stored as electric charges in a capacitor of a circuit in the in-vehicle equipment, and the like. In order to increase safety of the vehicle at the time of a collision accident with an obstacle (for example, another vehicle, a structure on a road, or the like), it is obliged in regulations to reduce a voltage of the specified in-vehicle equipment to be equal to or lower than a specified value within a specified time period from the collision of the vehicle. As such an electric discharging method, a method for supplying the electrical charges from the in-vehicle equipment to the motor by operating the inverter and converting electrical energy into thermal energy in the motor has been known. In addition, it is obliged in the regulations to smoothly unlock vehicle doors for a prompt escape of an occupant during the collision of the vehicle.

Due to a limitation on a space, the above-described auxiliary power supply is frequently provided in a motor room in a front portion of the vehicle. As means for further stably supplying the electric power to the controller that controls the inverter and the controller that controls door locks of the vehicle even in a case of a frontal collision of the vehicle, and the like, it is considered to mount a backup power supply on the vehicle in addition to the auxiliary power supply.

An unlocking device for a vehicle door is disclosed in JP-A-2003-262054 (Patent document 1). This device includes a backup power supply (a spare power supply) that is independent from a primary power supply, and supplies the electric power from this backup power supply to the controller that controls the door lock. With this configuration, even in the case where the electric power cannot be supplied from the primary power supply, the door can be unlocked by supplying the electric power from the backup power supply to the controller.

SUMMARY

In order to reliably comply with the above-described regulation, it is considered not only to unlock the door but also to discharge the electric power of the in-vehicle equipment by using the electric power supplied from the backup power supply. However, in the case where the backup power supply capable of outputting the high electric power in a short time is used after the collision of the vehicle, there is a problem of enlargement of the backup power supply.

The present disclosure has been made to solve the above-described problem and therefore has a purpose of providing a control method for a vehicle power supply apparatus capable of reliably unlocking a door and discharging electric power of in-vehicle equipment by using electric power supplied from a backup power supply, and a vehicle power supply apparatus.

In order to achieve the above-described purpose, the present disclosure is a control method for a vehicle power supply apparatus. The vehicle power supply apparatus includes: a drive power supply that supplies electric power to a motor for generating drive power of a vehicle; a motor controller that controls supply of the electric power to the motor; an auxiliary power supply that supplies the electric power to a door lock controller for controlling supply of the electric power to a door lock for locking or unlocking a door of the vehicle; and a backup power supply that is provided as a separate component from the drive power supply and the auxiliary power supply and supplies the electric power. The control method includes: a collision determination step for determining whether the vehicle has collided with the obstacle; a discharging step for operating the motor controller by using the electric power that is supplied from the backup power supply in the case where it is determined in the collision determination step that the vehicle has collided with the obstacle, and discharging the electric power of in-vehicle equipment that is supplied with the electric power from the drive power supply prior to the collision of the vehicle with the obstacle by supplying electric charges stored in the in-vehicle equipment to the motor; and an unlocking step for operating the door lock controller by using the electric power supplied from the backup power supply and unlocking the door after a lapse of a specified time period since initiation timing of the discharging step.

According to this configuration, in the case where the vehicle collides with the obstacle, first, in the discharging step, the electric power of the in-vehicle equipment is discharged by using the electric power that is supplied from the backup power supply. Then, after the lapse of the specified time period since the initiation timing of the discharging step, in the unlocking step, the door is unlocked by using the electric power that is supplied from the backup power supply. Just as described, since initiation timing, at which a prominent reduction in a voltage occurs, differs between the motor controller and the door lock controller, the electric power, an amount of which is sufficient for the operation of each thereof, is supplied. As a result, the electric power of the in-vehicle equipment can be discharged, and the door of the vehicle can be unlocked.

In the present disclosure, preferably, after termination of the discharging step, the unlocking step is initiated.

According to this configuration, it is possible to further reliably supply the electric power, the amount of which is sufficient for the operation of each of the motor controller and the door lock controller. As a result, the electric power of the in-vehicle equipment can be discharged, and the door of the vehicle can be unlocked.

In order to achieve the above-described purpose, another aspect of the present disclosure is a vehicle power supply apparatus that includes: a motor controller that controls supply of electric power to a motor for generating drive power of a vehicle; a door lock controller that controls supply of the electric power to a door lock for locking or unlocking a door of the vehicle; a drive power supply that supplies the electric power to the motor; an auxiliary power supply that supplies the electric power to the motor controller and the door lock controller; a backup power supply that is provided as a separate component from the drive power supply and the auxiliary power supply and supplies the electric power; and a collision determination device that determines whether the vehicle has collided with an obstacle. In the case where the collision determination device determines that the vehicle has collided with the obstacle, the motor controller is operated by using the electric power that is supplied from the backup power supply, and executes discharge control for discharging the electric power of in-vehicle equipment that is supplied with the electric power from the drive power supply prior to the collision of the vehicle with the obstacle by supplying electric charges stored in the in-vehicle equipment to the motor, and, after a lapse of a specified time period since execution initiation timing of the discharge control, the door lock controller is operated by using the electric power supplied from the backup power supply and executes unlocking control for unlocking the door.

Also, in this aspect, since the initiation timing, at which the prominent reduction in the voltage occurs, differs between the motor controller and the door lock controller, the electric power, the amount of which is sufficient for the operation of each thereof, is supplied. As a result, the electric power of the in-vehicle equipment can be discharged, and the door of the vehicle can be unlocked.

The present disclosure has the purpose of providing the control method for the vehicle power supply apparatus capable of reliably unlocking the door and discharging the electric power of the in-vehicle equipment by using the electric power supplied from the backup power supply, and the vehicle power supply apparatus.

DETAILED DESCRIPTION

Figure 1:
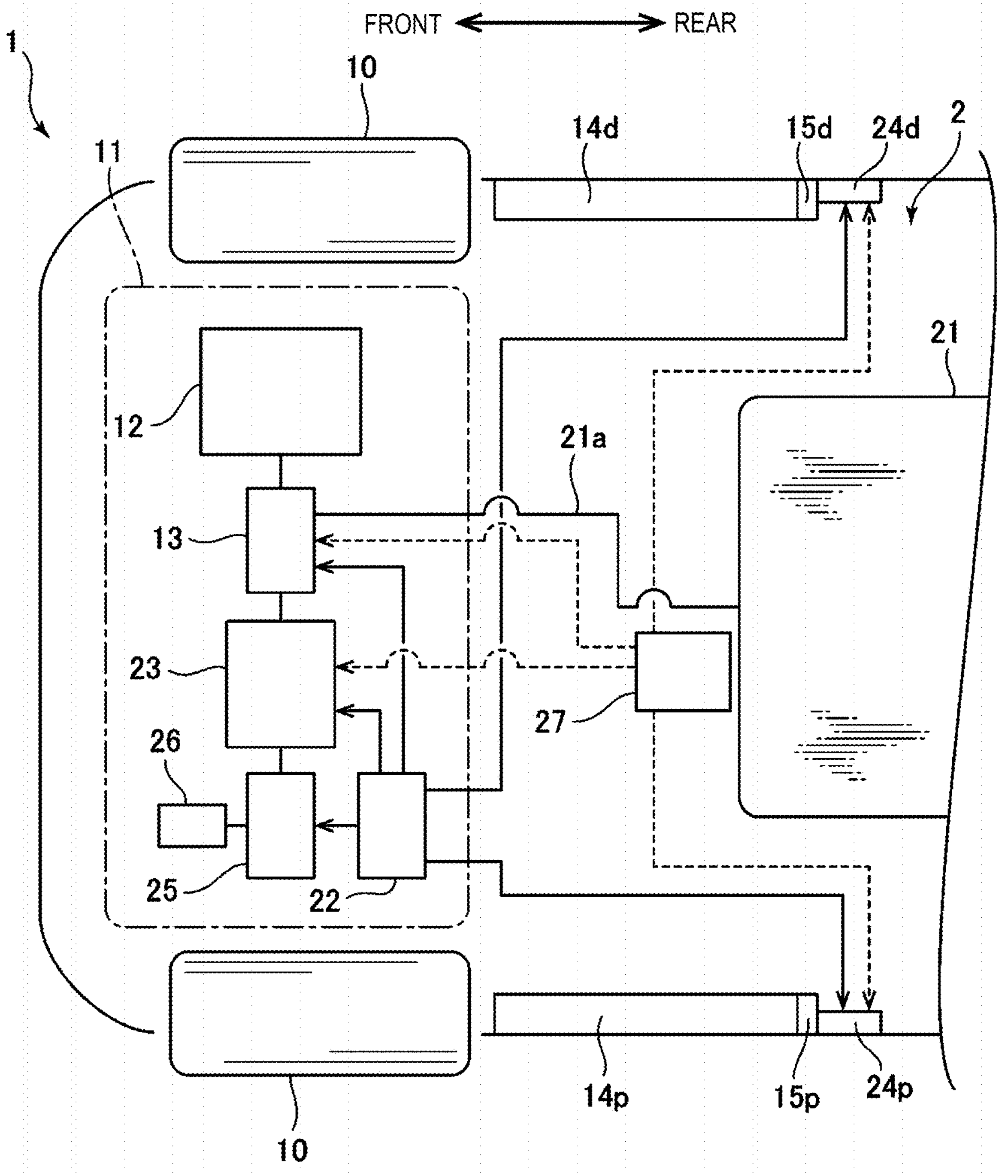
FIG. 1 is a layout view of a vehicle on which a vehicle power supply apparatus according to an embodiment is mounted.

A description will hereinafter be made on a vehicle power supply apparatus 2 according to an embodiment with reference to the accompanying drawings. First, a description will be made on a vehicle 1 on which the vehicle power supply apparatus 2 is mounted with reference to FIG. 1. FIG. 1 is a layout view of the vehicle 1 on which the vehicle power supply apparatus 2 is mounted, and illustrates a front portion of the vehicle 1.

A motor room 11 is formed in front of a driver's seat and a passenger's seat, which are not illustrated, in the vehicle 1. A motor 12 and an inverter 13 are arranged in the motor room 11. The motor 12 is a rotary electric machine that generates torque when being supplied with AC power and causes front wheels 10 of the vehicle 1 to rotate. The inverter 13 is electronic equipment that has plural capacitors and a switching element. The inverter 13 converts DC power into three-phase AC power by switching an on state and an off state of the switching element, and supplies the three-phase AC power to the motor 12. In the motor room, equipment such as an unillustrated converter is also arranged. The converter transforms electric power supplied from a drive power supply 21, which will be described later.

The vehicle 1 includes a door **14*d* on the driver's seat side, a door 14*p* on the passenger's seat side, and door locks 15*d*, 15*p* for respectively locking and unlocking the doors 14*d*, 14*p*. Each of the door locks 15*d*, 15*p* has an actuator, which is not illustrated. The doors 14*d*, 14*p*** are locked or unlocked when the actuator is operated on the basis of a received locking signal and a received unlocking signal.

The vehicle power supply apparatus 2 is mounted on the vehicle 1 that has such a configuration, and supplies in-vehicle equipment with the electric power that is required for operation thereof. The vehicle power supply apparatus 2 includes the drive power supply 21 and an auxiliary power supply 22.

The drive power supply 21 is a lithium-ion battery that stores the electric power. The drive power supply 21 is arranged in a substantially central portion of the vehicle 1 in a vehicle longitudinal direction and a vehicle width direction, extends from a position below the driver's seat and the passenger's seat of the vehicle 1 to a position below a rear seat. A charging port, which is not illustrated, is provided on a rear side surface of the vehicle 1, and the drive power supply 21 can store the electric power that is supplied from outside of the vehicle 1 via this charging port. The drive power supply 21 is configured to be able to output high-voltage DC power to the inverter 13 via a harness **21*a***.

The auxiliary power supply 22 is a lead-acid battery capable of outputting 12-V DC power. The auxiliary power supply 22 is arranged in the motor room 11. The auxiliary power supply 22 is configured to be supplied with the electric power that is generated by a generator, which is not illustrated, and be able to store the electric power.

Furthermore, the vehicle power supply apparatus 2 includes a motor controller 23, door lock controllers **24*d*, 24*p*, a collision determination device 25, and an acceleration sensor 26. These types of the in-vehicle equipment are configured to be mutually communicable by using a specified protocol via a control area network (CAN), which is not illustrated and mounted on the vehicle 1**.

The motor controller 23 is an electronic controller that controls supply of the electric power to the motor 12. The motor controller 23 is arranged in the motor room 11. In detail, the motor controller 23 controls the electric power to be supplied to the motor 12 from the inverter 13 by transmitting a control signal to the inverter 13, and thereby controls operation of the motor 12.

The door lock controllers **24*d*, 24*p* are electronic controllers that respectively control the door locks 15*d*, 15*p*. The door lock controllers 24*d*, 24*p* are arranged near the doors 14*d*, 14*p*, respectively. The door lock controllers 24*d*, 24*p* respectively operate the actuators of the door locks 15*d*, 15*p*** by transmitting the locking signal or the unlocking signal to the door locks 15_d_, 15_p_ and thereby lock or unlock the doors 14_d_, 14_p_. That is, the door lock controllers 24_d_, 24_p_ respectively supply the door locks 15_d_, 15_p_ with the electric power, an amount of which is sufficient for operation of the actuators, as the locking signal or the unlocking signal. The door lock controllers 24_d_, 24_p_ may respectively be unitized with the door locks 15_d_, 15_p_.

The collision determination device 25 is electronic equipment that determines whether the vehicle 1 has collided with an obstacle (for example, another vehicle, a structure on a road, or the like). The collision determination device 25 is arranged in the motor room 11. The collision determination device 25 receives a signal from the acceleration sensor 26 that detects acceleration of the vehicle 1, and determines whether the vehicle 1 has collided with the obstacle on the basis of the signal. In detail, the collision determination device 25 integrates a value that is based on the signal received from the acceleration sensor 26, and determines that the vehicle 1 has collided with the obstacle when an integral value in a specified period exceeds a threshold value. When determining that the vehicle 1 has collided with the obstacle, the collision determination device 25 transmits a collision signal to the motor controller 23, the door lock controllers 24_d_, 24_p_, and an airbag system, which is not illustrated.

Furthermore, the vehicle power supply apparatus 2 includes a backup power supply 27. The backup power supply 27 is a capacitor capable of storing the electric power. The backup power supply 27 is provided as a separate component from the drive power supply 21 and the auxiliary power supply 22 and is provided below the passenger's seat. The backup power supply 27 has smaller capacity than the drive power supply 21 and the auxiliary power supply 22.

In FIG. 1, electric power supply routes from the auxiliary power supply 22 are indicated by solid arrows extending from the auxiliary power supply 22. The auxiliary power supply 22 can supply the electric power to the inverter 13, the motor controller 23, the door lock controllers 24_d_, 24_p_, and the collision determination device 25.

In FIG. 1, electric power supply routes from the backup power supply 27 are indicated by broken arrows extending from the backup power supply 27. The backup power supply 27 can supply the electric power to the inverter 13, the motor controller 23, and the door lock controllers 24_d_, 24_p_.

In the case where the vehicle 1 is operated normally without being involved in the collision with the obstacle, the motor controller 23 and the door lock controllers 24_d_, 24_p_ can be operated by using the electric power that is supplied from the auxiliary power supply 22. The motor controller 23 controls the operation of the motor 12 by controlling the inverter 13, and causes the motor 12 to generate travel torque. The door lock controllers 24_d_, 24_p_ respectively lock or unlock the doors 14_d_, 14_p_ in response to a request of an occupant or the like. At this time, the auxiliary power supply 22 independently outputs the electric power, the amount of which is sufficient for the operation of the motor controller 23 and the door lock controllers 24_d_, 24_p_. That is, the motor controller 23 and the door lock controllers 24_d_, 24_p_ are operated by only using the electric power that is supplied from the auxiliary power supply 22 without being supplied with the electric power from the backup power supply 27.

Meanwhile, in the case where the auxiliary power supply 22 or the electric power supply route thereof fails due to the collision of the vehicle 1 with the obstacle, and thus the electric power cannot be supplied from the auxiliary power supply 22 to the motor controller 23 and the door lock controllers 24_d_, 24_p_, the motor controller 23 and the door lock controllers 24_d_, 24_p_ can be operated by using the electric power that is supplied from the backup power supply 27. That is, the backup power supply 27 independently outputs the electric power, the amount of which is sufficient for the operation of the motor controller 23 and the door lock controllers 24_d_, 24_p_.

Figure 2:
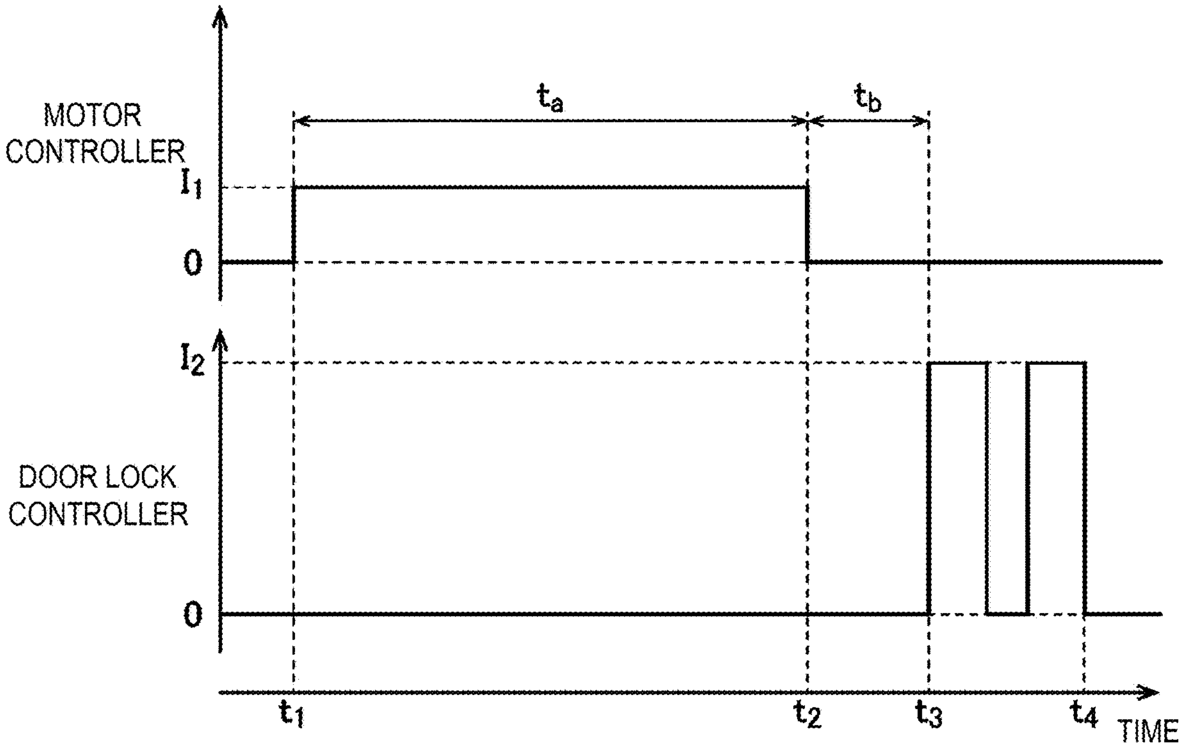
FIG. 2 is a time chart illustrating a current flowing through a motor controller and a door lock controller from a backup power supply in FIG. 1.

Next, a description will be made on the operation of the motor controller 23 and the door lock controllers 24_d_, 24_p_ in the case where the vehicle 1 collides with the obstacle with reference to FIG. 2. FIG. 2 is a time chart illustrating a current flowing through the motor controller 23 and the door lock controllers 24_d_, 24_p_ from the backup power supply 27.

At time $t_1$, the collision determination device 25 determines that the vehicle 1 has collided with the obstacle. Then, the collision determination device 25 transmits the collision signal to the motor controller 23 and the door lock controllers 24_d_, 24_p_. Thereafter, the motor controller 23 that has received the collision signal first starts being operated by using the electric power that is supplied from the backup power supply 27. At this time, a current $I_1$ flows through the motor controller 23 from the backup power supply 27.

The motor controller 23, which is operated by using the electric power supplied from the backup power supply 27, controls the inverter 13 and supplies the motor 12 with electric charges stored in the capacitors of the in-vehicle equipment such as the inverter 13. In detail, the motor controller 23 appropriately switches the switching element of the inverter 13 between the on state and the off state, and supplies the electric charges from the in-vehicle equipment to the motor 12 such that a current (referred to as an "d-axis current") with which the torque is not generated flows through the motor 12. As a result, electrical energy is converted into thermal energy in the motor 12, and the electric power of the in-vehicle equipment is discharged.

At time $t_2$ at which a time period $t_a$ elapses from the time $t_1$, the motor controller 23 stops being operated by using the electric power supplied from the backup power supply 27. The time period $t_a$ is set as a sufficient time period (for example, five seconds) for discharging the electric power of the in-vehicle equipment.

At time $t_3$ at which a time period $t_b$ elapses from the time $t_2$, the door lock controllers 24_d_, 24_p_ start being operated by using the electric power supplied from the backup power supply 27. At this time, a current $I_2$ flows through each of the door lock controllers 24_d_, 24_p_ from the backup power supply 27. The current $I_2$ is larger than the above-described current $I_1$.

The door lock controllers 24_d_, 24_p_, which are operated by using the electric power supplied from the backup power supply 27, respectively transmit the unlocking signal to the door locks 15_d_, 15_p_ and operate the actuators thereof. As a result, the doors 14_d_, 14_p_ are unlocked.

At time $t_4$ at which the transmission of the unlocking signal is completed, the door lock controllers 24_d_, 24_p_ stop being operated by using the electric power supplied from the backup power supply 27. The electric power of the in-vehicle equipment is discharged, and the doors 14_d_, 14_p_ are unlocked. Thus, the occupant can safely escape through the doors 14_d_, 14_p_.

Figure 3:
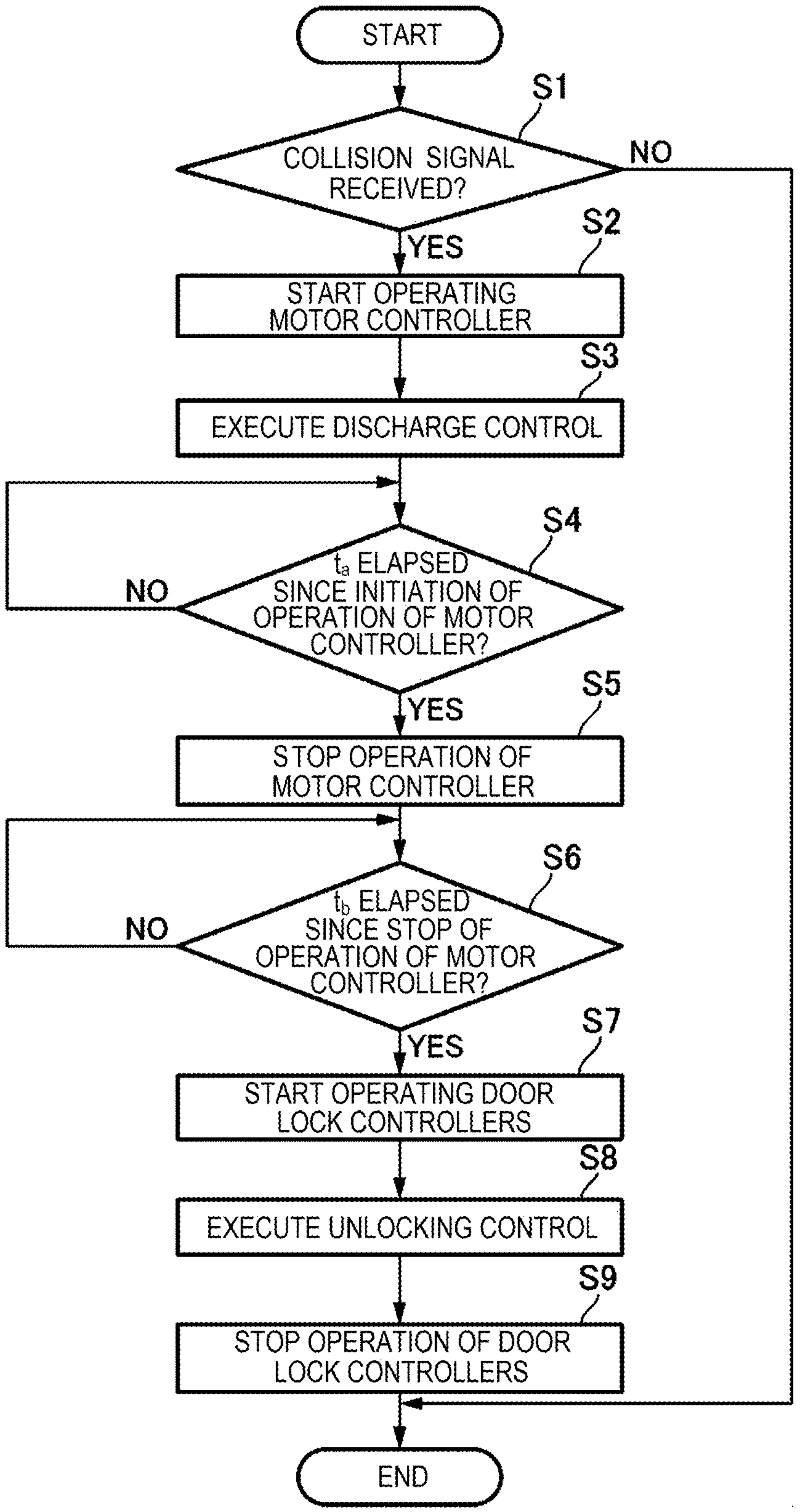
FIG. 3 is a flowchart illustrating processing executed by the motor controller and the door lock controller in FIG. 1.

Next, a description will be made on processing that is executed by the motor controller 23 and the door lock controllers 24_d_, 24_p_ with reference to FIG. 3. FIG. 3 is a flowchart illustrating the processing executed by the motor controller 23 and the door lock controllers 24_d_, 24_p_. The processing is repeatedly executed in a specified cycle.

In step S1, the motor controller 23 and the door lock controllers 24*d*, 24*p* determine whether the collision signal is received from the collision determination device 25. If determining that the collision signal is not received (S1: NO), the motor controller 23 and the door lock controllers 24*d*, 24*p* do not use the electric power supplied from the backup power supply 27, and the processing is terminated. On the other hand, if the motor controller 23 and the door lock controllers 24*d*, 24*p* determine that the collision signal is received (S1: YES), the processing proceeds to step S2. Step S1 corresponds to the "collision determination step" according to the present disclosure.

In step S2, the motor controller 23 starts being operated by using the electric power that is supplied from the backup power supply 27. Then, in step S3, the motor controller 23 executes discharge control. That is, the motor controller 23 supplies the motor 12 with the electric charges stored in the capacitors of the in-vehicle equipment such as the inverter 13, so as to discharge the electric power of the in-vehicle equipment. Step S3 corresponds to a "discharging step" according to the present disclosure.

In step S4, the motor controller 23 determines whether the time period $t_a$ has elapsed since the initiation of the operation of the motor controller 23. If the motor controller 23 determines that the time period $t_a$ has elapsed (S4: YES), the processing proceeds to step S5.

In step S5, the motor controller 23 stops being operated by using the electric power that is supplied from the backup power supply 27. As a result, the motor controller 23 terminates the execution of the discharge control.

In step S6, the door lock controllers 24*d*, 24*p* determine whether the time period $t_b$ has elapsed since the stop of the operation of the motor controller 23 by using the electric power that is supplied from the backup power supply 27. If the door lock controllers 24*d*, 24*p* determine that the time period $t_b$ has elapsed (S6: YES), the processing proceeds to step S7.

In step S7, the door lock controllers 24*d*, 24*p* start being operated by using the electric power that is supplied from the backup power supply 27. Then, in step S8, the door lock controllers 24*d*, 24*p* execute unlocking control. That is, the door lock controllers 24*d*, 24*p* respectively operate the actuators of the door locks 15*d*, 15*p* by transmitting the unlocking signal to the door locks 15*d*, 15*p* and thereby unlock the doors 14*d*, 14*p*. Step S8 corresponds to an "unlocking step" according to the present disclosure.

After transmitting the unlocking signal, in step S9, the door lock controllers 24*d*, 24*p* stop being operated by using the electric power that is supplied from the backup power supply 27.

Next, a description will be made on operational effects based on the configuration of this embodiment.

According to the above configuration, in the case where the vehicle 1 collides with the obstacle, first, in the discharging step, the electric power of the in-vehicle equipment is discharged by using the electric power that is supplied from the backup power supply 27. Then, after the lapse of the specified time period (the time period $t_a$ illustrated in FIG. 2) from the initiation timing (the time $t_1$ illustrated in FIG. 2) of the discharging step, in the unlocking step, the doors 14*d*, 14*p* are unlocked by using the electric power that is supplied from the backup power supply 27. Just as described, since the initiation timing, at which the prominent reduction in the voltage occurs, differs between the motor controller 23 and the door lock controllers 24*d*, 24*p*, the electric power, the amount of which is sufficient for the operation of each thereof, is supplied. As a result, the electric power of the in-vehicle equipment can be discharged, and the doors 14*d*, 14*p* of the vehicle can be unlocked.

After the termination of the discharging step, the unlocking step is initiated. According to this configuration, it is possible to further reliably supply the electric power, the amount of which is sufficient for the operation of each of the motor controller 23 and the door lock controllers 24*d*, 24*p*. As a result, the electric power of the in-vehicle equipment can be discharged, and the doors 14*d*, 14*p* of the vehicle 1 can be unlocked.

The embodiment that has been described so far is merely provided to facilitate understanding of the present disclosure, and thus is not provided to limit interpretation of the present disclosure. Each of the elements included in the embodiment as well as arrangement, a material, a condition, a shape, size, and the like thereof is not limited to what has been exemplified above and can appropriately be changed.

Figure 4:
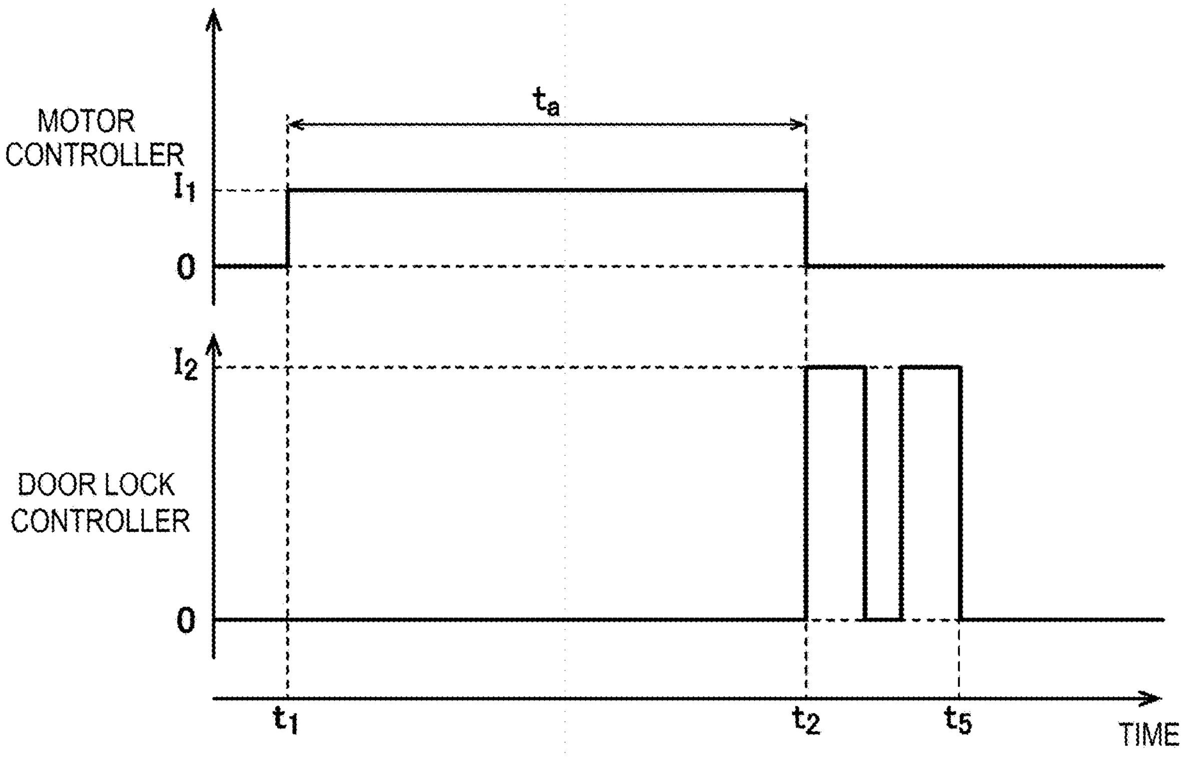
FIG. 4 is a time chart illustrating a current flowing through a motor controller and a door lock controller from a backup power supply for a vehicle power supply apparatus according to another embodiment.

In the above embodiment, after the lapse of the time period $t_b$ since the time $t_2$, at which the motor controller 23 stops being operated by using the electric power supplied from the backup power supply 27, the door lock controllers 24*d*, 24*p* start being operated by using the electric power supplied from the backup power supply 27. However, the present disclosure is not limited to this embodiment. For example, as illustrated in FIG. 4, at the time $t_2$, at the same time as the stop of the operation of the motor controller 23, the door lock controllers 24*d*, 24*p* may start being operated by using the electric power supplied from the backup power supply 27. FIG. 4 is a time chart illustrating a current flowing through a motor controller and door lock controllers from a backup power supply for a vehicle power supply apparatus according to another embodiment. Alternatively, prior to the stop of the operation of the motor controller 23, the door lock controllers 24*d*, 24*p* may start being operated by using the electric power supplied from the backup power supply 27.

In the above embodiment, as illustrated in FIG. 1, the inverter 13, the motor controller 23, and the door lock controllers 24*d*, 24*p* are electrically connected to the backup power supply 27. In the present disclosure, a switchable relay may be provided to electrically connect/disconnect the inverter 13 and the like to/from the backup power supply 27. In this case, for example, the relay is switched such that the inverter 13 and the like are electrically connected to the backup power supply 27 on the basis of the collision signal received from the collision determination device 25. In such a case, only when the vehicle 1 collides with the obstacle, the electric power can be supplied from the backup power supply 27.

DESCRIPTION OF REFERENCE SIGNS AND NUMERALS

1: Vehicle
12: Motor
13: Inverter (in-vehicle equipment)
14*d*, 14*p*: Door
15*d*, 15*p*: Door lock
2: Vehicle power supply apparatus
21: Drive power supply
22: Auxiliary power supply
23: Motor controller
24*d*, 24*p*: Door lock controller
25: Collision determination device
27: Backup power supply

The invention claimed is:

1. A control method for a vehicle power supply apparatus, the control method comprising:

providing, by a first power supply, electric power to a motor for generating drive power for a vehicle;

supplying, by a second power supply, electric power to a motor controller that controls supply of electric power to the motor and a door lock controller that controls supply of electric power to a door lock for locking or unlocking a door of the vehicle;

providing electric power by a third power supply that is a separate power supply from the first power supply and the second power supply;

determining whether a vehicle has collided with an obstacle; and in a case that it is determined that the vehicle has collided with the obstacle, operating the motor controller by using the electric power supplied from the third power supply;

discharging electric power of in-vehicle equipment that was previously supplied with electric power from the first power supply prior to the collision of the vehicle with the obstacle by discharging electric charge stored in the in-vehicle equipment to the motor; and operating the door lock controller by using the electric power supplied from the third power supply and unlocking the door after a lapse of a specified time period since initiation timing of the discharging.

2. The method of claim 1, wherein unlocking the door is performed after the discharging.

3. The method of claim 1, wherein determining whether the vehicle has collided with the obstacle comprises:

receiving a signal from an acceleration sensor configured to detect acceleration of the vehicle; and determining whether the vehicle has collided with the obstacle based on the signal received from the acceleration sensor.

4. The method of claim 3, wherein determining whether the vehicle has collided with the obstacle based on the signal received from the acceleration sensor includes integrating a value based on the signal received from the acceleration sensor, and determining that the vehicle has collided with the obstacle when an integral value in a predetermined period exceeds a threshold value.

5. The method of claim 1, wherein the third power supply is a capacitor configured to store electric power.

6. The method of claim 5, wherein the third power supply is provided as a separate component from the first power supply, and the second power supply is provided as a separate component from first power supply.

7. The method of claim 6, wherein the second power supply is provided below a passenger seat in the vehicle.

8. A vehicle power supply system comprising:

a motor controller configured to control supply of electric power to a motor for generating drive power of a vehicle;

a door lock controller configured to control supply of electric power to a door lock for locking or unlocking a door of the vehicle;

a first power supply configured to supply the electric power to the motor;

a second power supply configured to supply electric power to the motor controller and the door lock controller;

a third power supply that is provided as a separate component from the first power supply and the second power supply and supplies electric power; and processing circuitry configured to determine whether the vehicle has collided with an obstacle, wherein in the case where the collision determination device determines that the vehicle has collided with the obstacle, the motor controller is operated by using the electric power that is supplied from the third power supply, and is configured to execute discharge control for discharging the electric power of in-vehicle equipment that was previously supplied with the electric power from the first power supply prior to the collision of the vehicle with the obstacle by discharging electric charge stored in the in-vehicle equipment to the motor; and after a lapse of a specified time period since execution initiation timing of the discharge control, the door lock controller is operated by using electric power supplied from the third backup power supply and executes unlocking control for unlocking the door.

9. The vehicle power supply apparatus of claim 8, wherein after termination of the execution of the discharge control, the door lock controller initiates execution of the unlocking control.

10. The vehicle power supply apparatus of claim 8, wherein the processing circuitry is configured to:

receive a signal from an acceleration sensor configured to detect acceleration of the vehicle; and determine whether the vehicle has collided with the obstacle based on the signal received from the acceleration sensor.

11. The vehicle power supply apparatus of claim 10, wherein the processing circuitry is configured to determine whether the vehicle has collided with the obstacle based on the signal received from the acceleration sensor by integrating a value based on the signal received from the acceleration sensor, and determining that the vehicle has collided with the obstacle when an integral value in a predetermined period exceeds a threshold value.

12. The vehicle power supply apparatus of claim 8, wherein the third power supply is a capacitor configured to store electric power.

13. The vehicle power supply apparatus of claim 12, wherein the third power supply is provided as a separate component from the first power supply.

14. The vehicle power supply apparatus of claim 12, wherein the second power supply is provided as a separate component from first power supply.

15. The vehicle power supply apparatus of claim 14, wherein the second power supply is provided below a passenger seat in the vehicle.

16. The vehicle power supply apparatus of claim 8, further comprising:

an inverter, wherein the motor controller, which is operated using electric power supplied from the third power supply, performs control to supply the motor with electric charge stored in a capacitor of the inverter.

17. The vehicle power supply apparatus of claim 16, wherein the motor controller is configured to:

switch a switching element of the inverter between an on state and an off state; and supply electric charge from the inverter to the motor at a level that torque is not generated, by the motor.

18. A vehicle power supply apparatus comprising:

processing circuitry configured to determine whether the vehicle has collided with an obstacle, wherein in the case where the collision determination device determines that the vehicle has collided with the obstacle, operating a motor controller using electric power supplied from a backup power supply, wherein the motor controller is configured to execute discharge control for discharging electric power of in-vehicle equipment that was previously supplied with the electric power from a drive power supply, prior to the collision of the vehicle with the obstacle by discharging electric charge stored in the in-vehicle equipment to the motor; and after a lapse of a specified time period since execution initiation timing of the discharge control, operating a door lock controller using electric power supplied from the backup power supply and executing unlocking control for unlocking the door.

19. The vehicle power supply apparatus of claim 18, wherein the processing circuitry is configured to:

receive a signal from an acceleration sensor configured to detect acceleration of the vehicle; and determine whether the vehicle has collided with the obstacle based on the signal received from the acceleration sensor.

20. The vehicle power supply apparatus of claim 18, further comprising:

an auxiliary power supply, wherein the backup power supply is provided as a separate component from the drive power supply, the auxiliary power supply is provided as a separate component from drive power supply, and the auxiliary power supply is provided below a passenger seat in the vehicle.

* * * * *